(12) United States Patent
Yamada

(10) Patent No.: US 9,446,899 B2
(45) Date of Patent: Sep. 20, 2016

(54) TRANSFERRING APPARATUS WITH PINION GEARS

(71) Applicant: Murata Machinery, Ltd., Kyoto-shi, Kyoto (JP)

(72) Inventor: Fumie Yamada, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/423,397

(22) PCT Filed: Apr. 16, 2013

(86) PCT No.: PCT/JP2013/061297
§ 371 (c)(1),
(2) Date: Feb. 23, 2015

(87) PCT Pub. No.: WO2014/034173
PCT Pub. Date: Mar. 6, 2014

(65) Prior Publication Data
US 2015/0203294 A1  Jul. 23, 2015

(30) Foreign Application Priority Data
Aug. 31, 2012 (JP) ................................. 2012-191959

(51) Int. Cl.
*B65G 1/04* (2006.01)
(52) U.S. Cl.
CPC ............... *B65G 1/04* (2013.01); *B65G 1/0407* (2013.01); *B65G 1/0435* (2013.01)

(58) Field of Classification Search
CPC ....................................................... B65G 1/04
See application file for complete search history.

(56) References Cited

U.S. PATENT DOCUMENTS 3,746,189 A * 7/1973 Burch .................. B65G 1/0428
414/273
8,162,585 B2 * 4/2012 Tsujimoto ............ B65G 1/0407
414/273

FOREIGN PATENT DOCUMENTS

| CN | 201471439 U | | 5/2010 |
|---|---|---|---|
| JP | 06-035209 | | 5/1994 |
| JP | 2006182510 A | * | 7/2006 |
| JP | 2011-207616 A | | 10/2011 |
| JP | 2012-071931 | | 4/2012 |
| JP | 2012071931 A | * | 4/2012 |

* cited by examiner

Primary Examiner — Gerald McClain
(74) Attorney, Agent, or Firm — DLA Piper LLP (US)

(57) ABSTRACT

A transferring apparatus includes a plurality of side-arm transfer units each provided with a pair of side arms each of which is capable of stretching toward and retracting from both sides of an object to be conveyed. The side-arm transfer units are arranged side by side in a left-and-right direction that is orthogonal to a stretching-and-retracting direction of the side arms. The side arms each include pinion gears, a rack gear, and a motor that drives the pinion gears. The motors positioned between the side-arm transfer units are connected to the pinion gears whose positions in the stretching-and-retracting direction are different from each other.

2 Claims, 8 Drawing Sheets

Fig.8
(a)
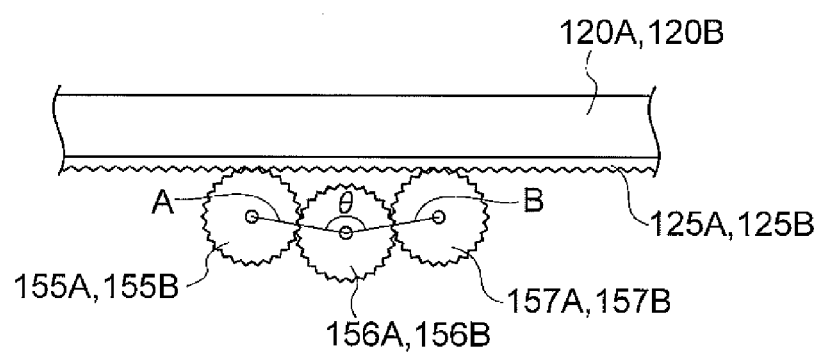
(b)
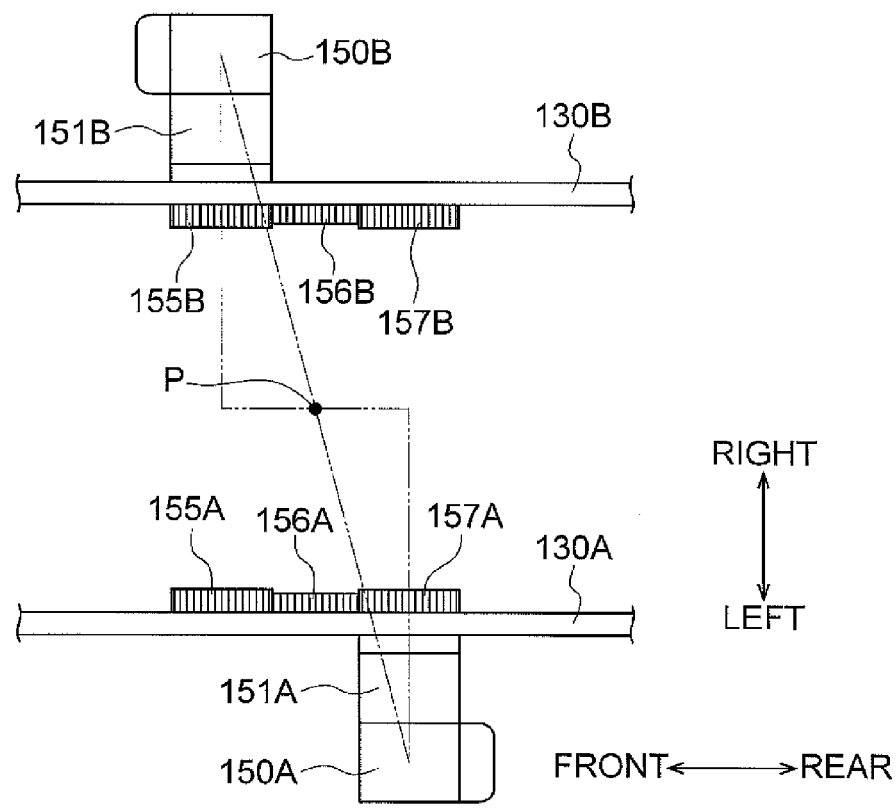

TRANSFERRING APPARATUS WITH PINION GEARS

CROSS REFERENCE TO RELATED APPLICATIONS

This application is a national stage of international application PCT/JP2013/061297, filed on Apr.16, 2013, and claims the benefit of priority under 35 USC 119 of Japanese application 2012- 191959, filed on Aug.31, 2012, which are incorporated herein by reference.

TECHNICAL FIELD

The present invention relates to a transferring apparatus, and particularly relates to a transferring apparatus that includes a plurality of side-arm transfer units provided with a pair of side arms.

BACKGROUND ART

Conventionally, a side-arm transfer unit provided with a pair of side arms has been available. This side-arm transfer unit stretches the respective side arms in a pair to both sides of an object to be conveyed placed on a rack, for example, hooks both sides of the object with the pair of side arms or catches the object with the pair of the side arms, and retracts the side arms to transfer the object to the side-arm transfer unit. A transferring apparatus is known in which two side-arm transfer units are arranged side by side to improve conveyance efficiency, for example (see Patent Literature 1, for example).

CITATION LIST

Patent Literature

[Patent Literature 1] Japanese Patent Application Laid-Open Publication No. 2012-71931

SUMMARY OF INVENTION

Technical Problem

Because a transferring apparatus including a plurality of side-arm transfer units is configured so that the side-arm transfer units are arranged side by side, the size of the transferring apparatus tends to be larger. Accordingly, to improve space efficiency, for example, transferring apparatuses are required to be made smaller.

In view of this, the present invention aims to provide a transferring apparatus that enables the size of the apparatus body to be made smaller.

Solution to Problem

A transferring apparatus according to one aspect of the present invention includes a plurality of side-arm transfer units each provided with a pair of side arms each of which is capable of stretching toward and retracting from both sides of an object to be conveyed. The side-arm transfer units are arranged side by side in a left-and-right direction that is orthogonal to a stretching-and-retracting direction of the side arms. Each of the side arms includes a base member, a middle member that advances from and retreats to the base member in the stretching-and-retracting direction, and a top member that advances from and retreats to the middle member in the stretching-and-retracting direction. The base member includes three or more pinion gears that are arranged along the stretching-and-retracting direction and a motor that drives the pinion gears. The middle member includes a rack gear that engages with at least one of the pinion gears and extends in the stretching-and-retracting direction. The motor is arranged outside an area between a pair of the base members of the pair of the side arms. The motors positioned between the pair of the side arms in one of the side-arm transfer units and the pair of the side arms in another one of the side-arm transfer units that is adjacent to the one of the side-arm transfer units are connected to the pinion gears whose positions in the stretching-and-retracting direction are different from each other.

In this transferring apparatus, the positions of two motors positioned between the pair of the side arms of one of the side-arm transfer units and the pair of the side arms of the other one of the side-arm transfer units are shifted from each other in the stretching-and-retracting direction of the side arms. When the side-arm transfer units are arranged side by side, this shift enables the distance between the side-arm transfer units to be reduced without interference with each other of the two motors positioned between a pair of the side arms. This reduced distance enables the size of the transferring apparatus to be smaller. Because the size of the transferring apparatus can be reduced, a receiving station and a shipping station where objects to be conveyed are transferred between transferring apparatuses can also be made smaller. Furthermore, because the distance between the side-arm transfer units can be reduced only by changing positions of connecting the motors to the pinion gears, mechanisms themselves of the pinion gears and the rack gears can be made common between the side-arm transfer units.

The motor provided to the side arm on the left side of the left-and-right direction in the one of the side-arm transfer units and the motor provided to the side arm on the left side of the left-and-right direction in the other one of the side-arm transfer units may be connected to the pinion gears whose positions in the stretching-and-retracting direction are the same. It is preferable that the motor provided to the side arm on the right side of the left-and-right direction in the one of the side-arm transfer units and the motor provided to the side arm on the right side of the left-and-right direction in the other one of the side-arm transfer units be connected to the pinion gears whose positions in the stretching-and-retracting direction are the same. In this case, the positions of connecting the motors to the pinion gears are the same between the side-arm transfer units. Three or more side-arm transfer units thus configured can be arranged side by side with a reduced distance between the respective side-arm transfer units without interference with each other of the motors positioned between the side-arm transfer units. Because the positions where the motors are installed are the same in the side-arm transfer units, load variations among the side-arm transfer units can be reduced.

The numbers of the pinion gears included in the respective ones of the pair of the base members of the side-arm transfer units may be the same. It is preferable that the respective motors included in the respective ones of the pair of the base members of the side-arm transfer units be connected to the pinion gears that are point-symmetrical with respect to the center of positions where the pinion gears included in the pair of the base members are arranged. In this case, because the motors are arranged point-symmetrically with respect to the pinion gears, in one of the side-arm transfer units, one side of the base members can be configured the same as the other side of the base members, whereby commonality of components can be achieved.

It is preferable that the base member of at least one of the side arms out of the pair of the side arms be movable in the left-and-right direction. This movability enables the distance between the pair of the side arms to be adjusted in accordance with the size of an object to be conveyed, so that various sizes of objects to be conveyed can be transferred.

Advantageous Effects of Invention

According to one aspect of the present invention, the size of an apparatus body can be made smaller.

BRIEF DESCRIPTION OF DRAWINGS

FIG. 5 includes diagrams illustrating stretching and retracting states of side arms, in which FIG. 5A illustrates a state of the arms being retracted, FIG. 5B illustrates a state of the arms being stretched forward, and FIG. 5C illustrates a state of the arms being stretched rearward.

FIG. 8 includes diagrams illustrating arrangement of pinion gears, in which FIG. 8A is a diagram of the pinion gears when viewed from the side and FIG. 8B is a top view illustrating positions where motors are installed.

DESCRIPTION OF EMBODIMENTS

Figure 1:
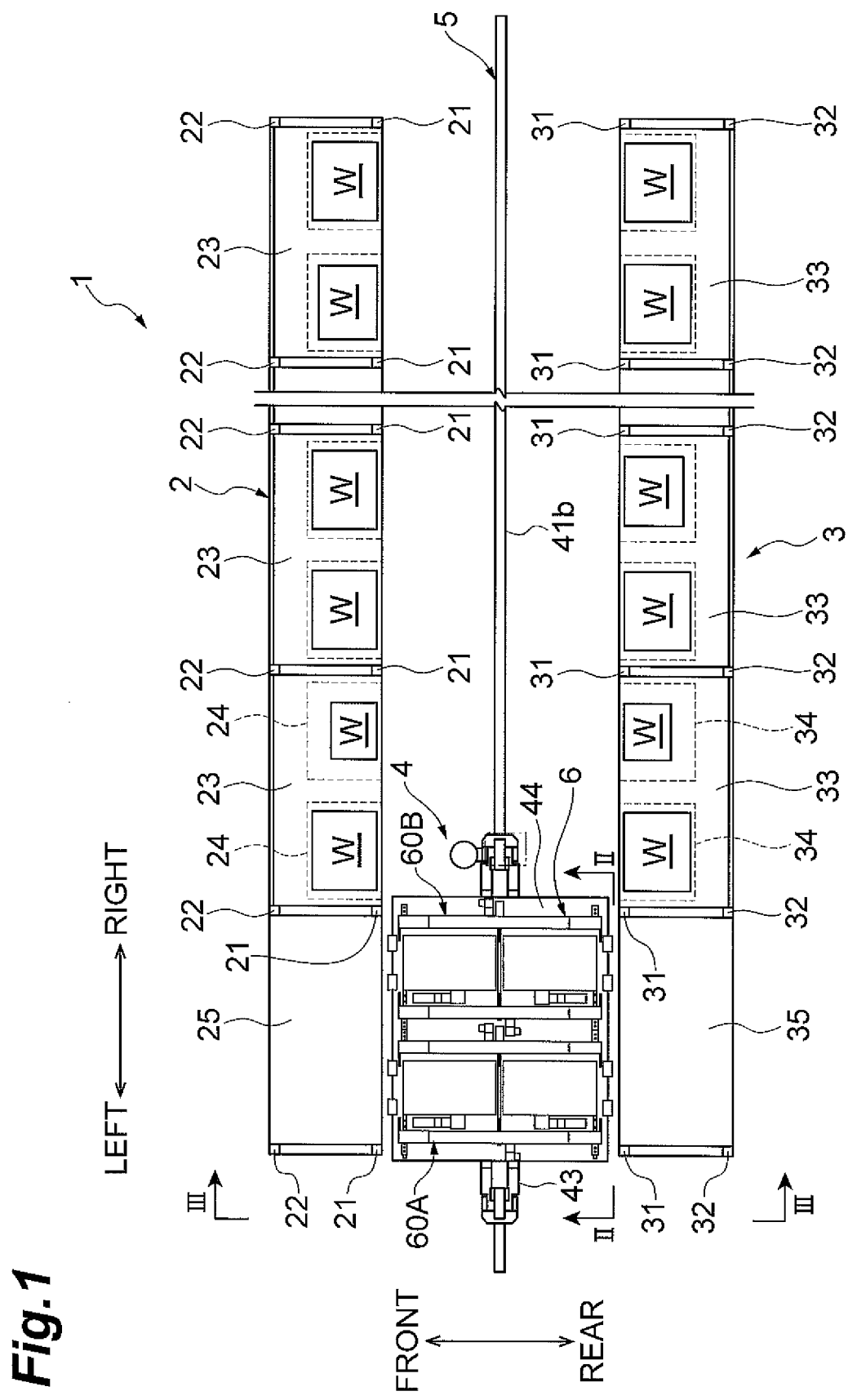
FIG. 1 is a schematic plan view of an automated warehouse according to one embodiment to which a transferring apparatus is applied.

One embodiment of an automated warehouse to which a transferring apparatus of the present invention is applied will be described with reference to the drawings. In the present embodiment, as depicted in FIG. 1, directions will be explained on the assumption that the right side and the left side of the left-and-right direction in FIG. 1 are respectively defined as "right" and "left", where the left-and-right direction is a moving direction of a transferring apparatus 6. As depicted in FIG. 1, the directions will be explained on the assumption that, when the right side is viewed from the transferring apparatus 6, the left side is defined as "front" and the right side is defined as "rear". In other words, the left-and-right direction and the front-and-rear direction are orthogonal to each other.

(Overall Structure of Automated Warehouse)

As depicted in FIG. 1, this automated warehouse 1 includes a front rack 2, a rear rack 3, and a stacker crane 4 that travels therebetween.

(Racks)

The front rack 2 and the rear rack 3 are respectively arranged at front and rear positions with respect to a traveling path 5 for the stacker crane 4 extending in the left-and-right direction so as to sandwich the traveling path 5. The front rack 2 includes a plurality of first posts 21 that are arranged at certain intervals along the traveling path 5, a plurality of second posts 22 that are arranged at the certain intervals along the traveling path 5 in positions more apart from the traveling path 5 than the first posts 21, and a plurality of shelves 23 that are disposed across between adjacent ones of the first posts 21 and the second posts 22. The shelves 23 are arranged in plurality along the left-and-right direction and also arranged in plurality along the height direction of the front rack 2. The rear rack 3 includes a plurality of first posts 31 that are arranged at the certain intervals along the traveling path 5, a plurality of second posts 32 that are arranged at the certain intervals along the traveling path 5 in positions more apart from the traveling path 5 than the first posts 31, and a plurality of shelves 33 that are disposed across between adjacent ones of the first posts 31 and the second posts 32. The shelves 33 are arranged in plurality along the left-and-right direction and also arranged in plurality along the height direction of the rear rack 3.

On each of the shelves 23, two storage sections 24 are formed along the left-and-right direction. Packages (objects to be conveyed) W can be stored in the storage sections 24. Specifically, two packages W can be placed along the left-and-right direction on each of the shelves 23. On each of the shelves 33, two storage sections 34 are formed along the left-and-right direction. Packages (objects to be conveyed) W can be stored in the storage sections 34. Specifically, two packages W can be placed along the left-and-right direction on each of the shelves 33.

At the lowest stage on the left side of the front rack 2, a receiving station 25 for receiving packages W is provided. At the lowest stage on the left side of the rear rack 3, a shipping station 35 for shipping packages W is provided. In the receiving station 25 and the shipping station 35 also, two packages W arranged along the left-and-right direction can be received and shipped.

(Stacker Crane)

Figure 2:
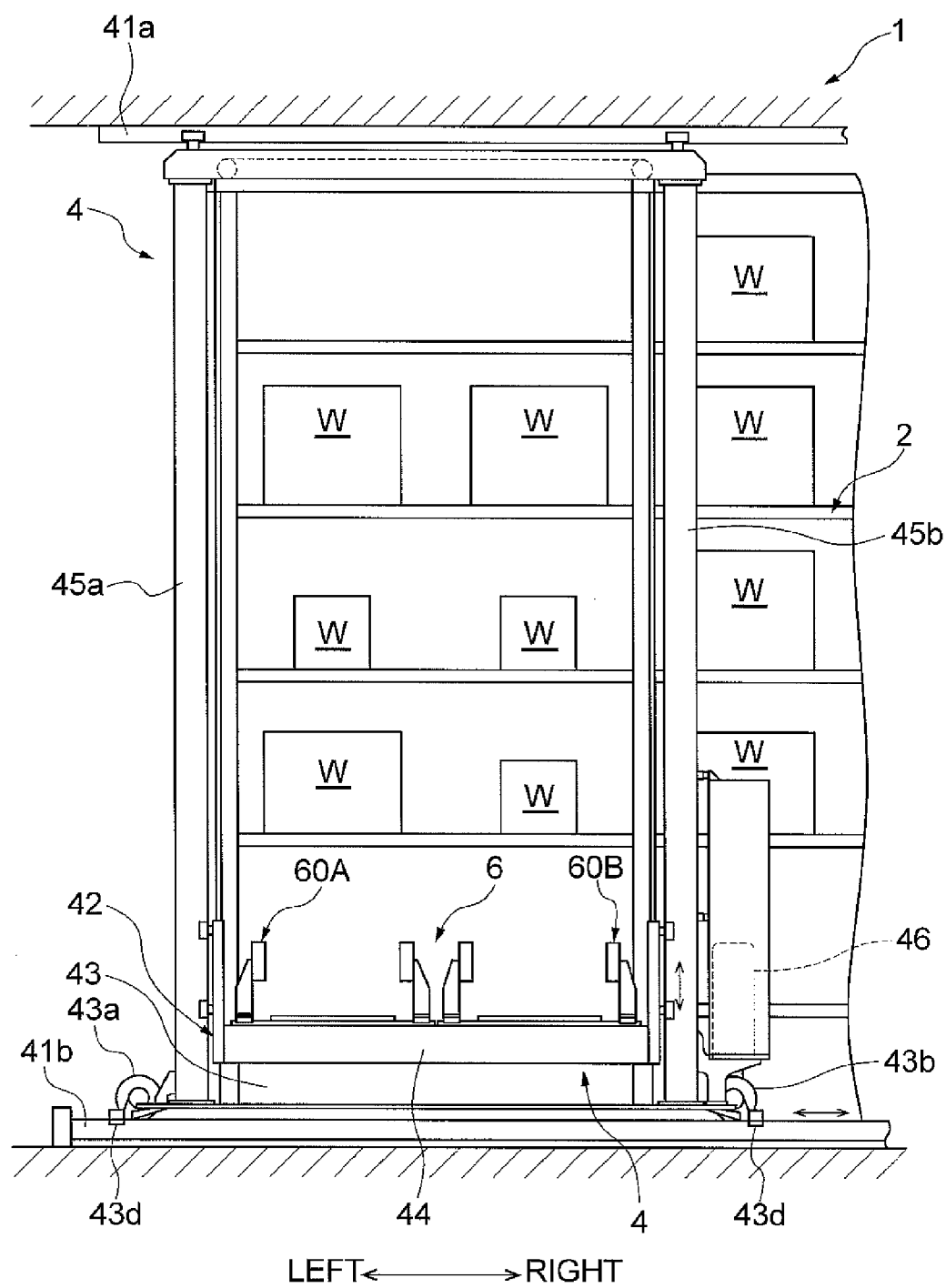
FIG. 2 is a sectional diagram taken along the line II-II of FIG. 1.
Figure 3:
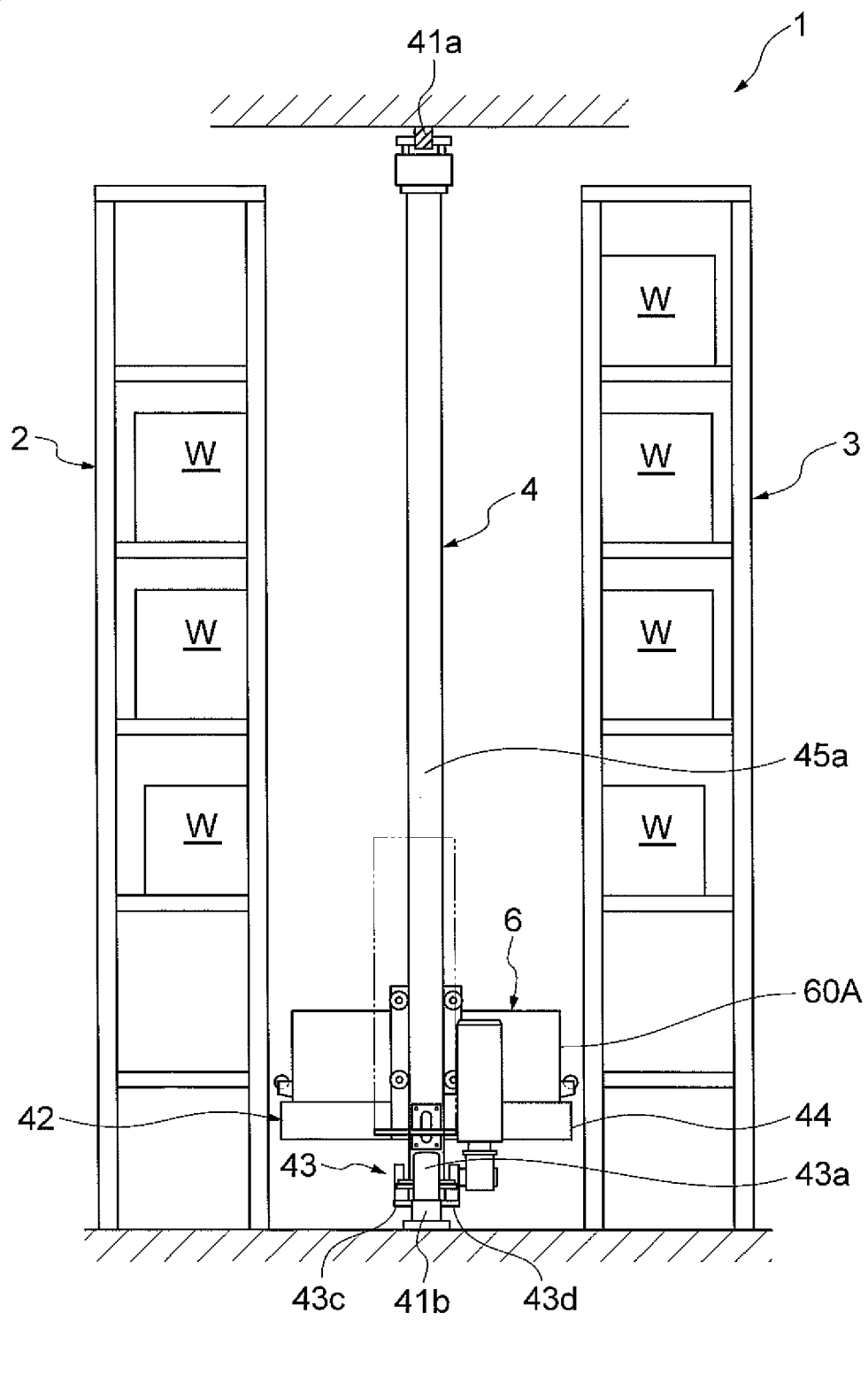
FIG. 3 is a sectional diagram taken along the line III-III of FIG. 1.

As depicted in FIGS. 1 to 3, on the ceiling and the floor of the warehouse, for example, an upper guide rail 41a and a lower guide rail 41b that extend along the traveling path 5 are respectively provided. With the upper guide rail 41a and the lower guide rail 41b, the stacker crane 4 is guided in a movable manner in the left-and-right direction. The stacker crane 4 conveys packages W between the receiving station 25, the storage sections 24, the storage sections 34, and the shipping station 35.

As depicted in FIGS. 2 and 3, the stacker crane 4 includes a traveling vehicle 42 having a vehicle body 43 and an elevating platform (body portion) 44 and the transferring apparatus 6 provided on the elevating platform 44. The vehicle body 43 is provided with a left traveling wheel 43a and a right traveling wheel 43b at the respective ends thereof in the left-and-right direction. The left traveling wheel 43a and the right traveling wheel 43b are rotatably supported by bearings provided to the vehicle body 43, and travel on the lower guide rail 41b. The vehicle body 43 is provided, at both ends thereof in the left-and-right direction, with a front guide roller 43c and a rear guide roller 43d that sandwich the lower guide rail 41b respectively from front and rear sides. With the front guide roller 43c and the rear guide roller 43d, the transferring apparatus 6 is guided along the lower guide rail 41b. The right traveling wheel 43b is driven by a motor 46 for traveling.

On the vehicle body 43, a left mast 45a and right mast 45b are fixed inside the left traveling wheel 43a and the right traveling wheel 43b. The left mast 45a and the right mast 45b extend in the height direction of the front rack 2 and the rear rack 3. The elevating platform 44 is elevatably mounted on the left mast 45*a* and the right mast 45*b* provided on the vehicle body 43. The transferring apparatus 6 is placed on the elevating platform 44.

(Transferring Apparatus)

Figure 4:
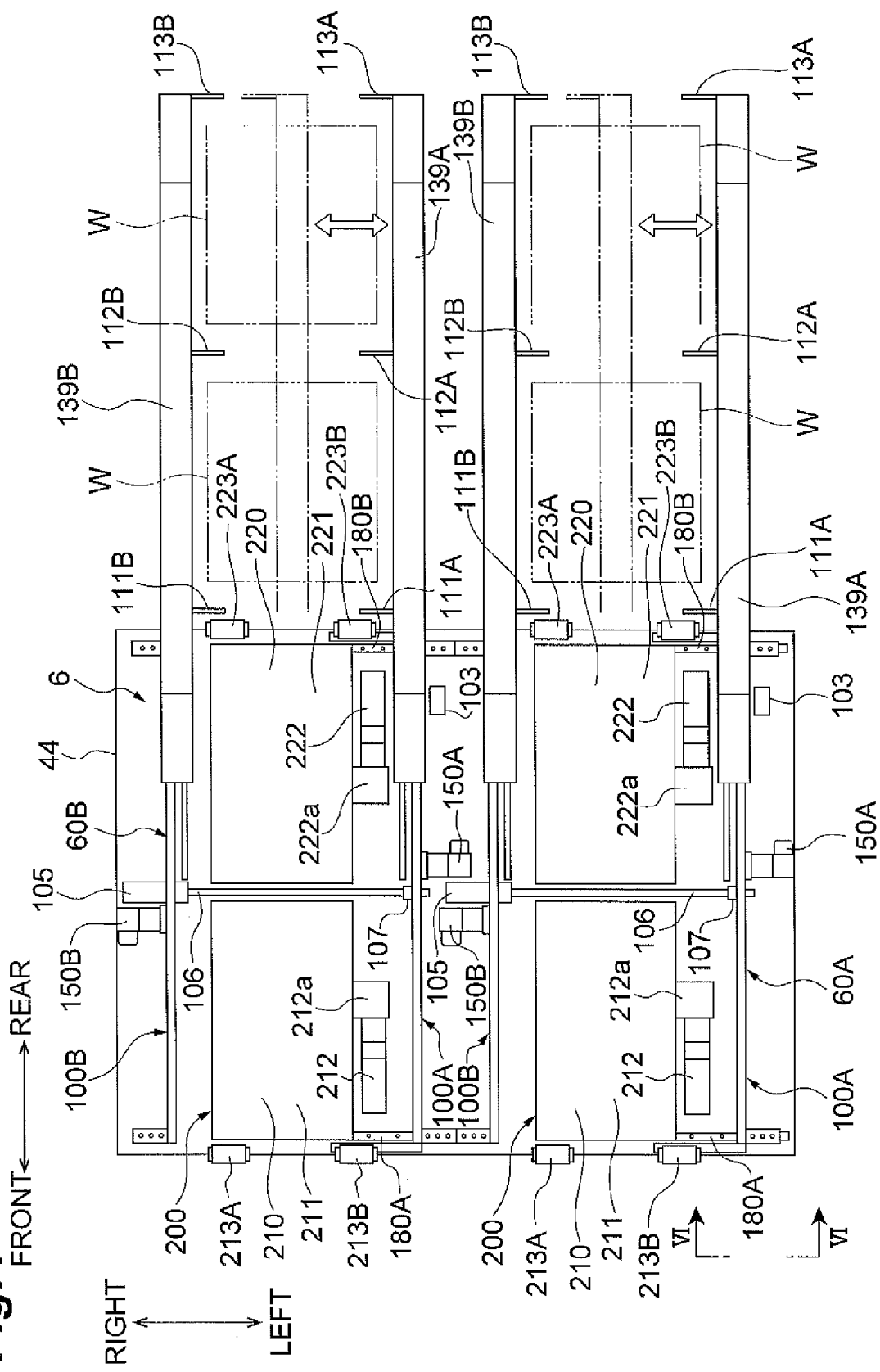
FIG. 4 is a schematic plan view of the transferring apparatus.

The transferring apparatus 6 includes a side-arm transfer unit 60A and a side-arm transfer unit 60B as depicted in FIG. 4. The side-arm transfer unit 60A and the side-arm transfer unit 60B each are placed on the elevating platform 44 along the left-and-right direction. The side-arm transfer unit 60A is arranged on the left side of the side-arm transfer unit 60B. The side-arm transfer unit 60A and the side-arm transfer unit 60B each transfer packages W between the stacker crane 4, the receiving station 25, the storage sections 24, the storage sections 34, and the shipping station 35.

The side-arm transfer unit 60B is configured the same as the side-arm transfer unit 60A. Thus, only the respective components of the side-arm transfer unit 60A will be described in detail. Because the respective components of the side-arm transfer unit 60B are given the same reference signs as reference signs used for the description of the respective components of the side-arm transfer unit 60A, detail description of the side-arm transfer unit 60B is omitted.

The side-arm transfer unit 60A includes a left side arm 100A and a right side arm 100B that are paired with each other and a lower conveyor 200.

(Lower Conveyor)

The lower conveyor 200 includes a front conveyor 210 and a rear conveyor 220 as depicted in FIG. 4. The front conveyor 210 and the rear conveyor 220 are arranged with a certain gap therebetween along the front-and-rear direction. The front conveyor 210 is arranged on the front side of the rear conveyor 220. The front conveyor 210 includes an endless belt 211 and a drive motor 212. The endless belt 211 is driven by the drive motor 212 so that packages W placed on the upper surface of the endless belt 211 can be conveyed in the front-and-rear direction. The drive motor 212 is arranged so that the rotating shaft thereof is aligned in the front-and-rear direction. To the distal end of the rotating shaft of the drive motor 212, an adapter 212*a* for changing the direction of the rotating shaft by 90 degrees is attached. The adapter 212*a* changes the direction of the rotating shaft of the drive motor 212 by 90 degrees. The endless belt 211 is driven by the drive motor 212 the direction of the rotating shaft of which is changed 90 degrees by the adapter 212*a*.

The rear conveyor 220 includes an endless belt 221, a drive motor 222, and an adapter 222*a*. Because the endless belt 221, the drive motor 222, and the adapter 222*a* are respectively configured the same as the endless belt 211, the drive motor 212, and the adapter 212*a* of the front conveyor 210, detail explanation thereof is omitted.

Figure 7:
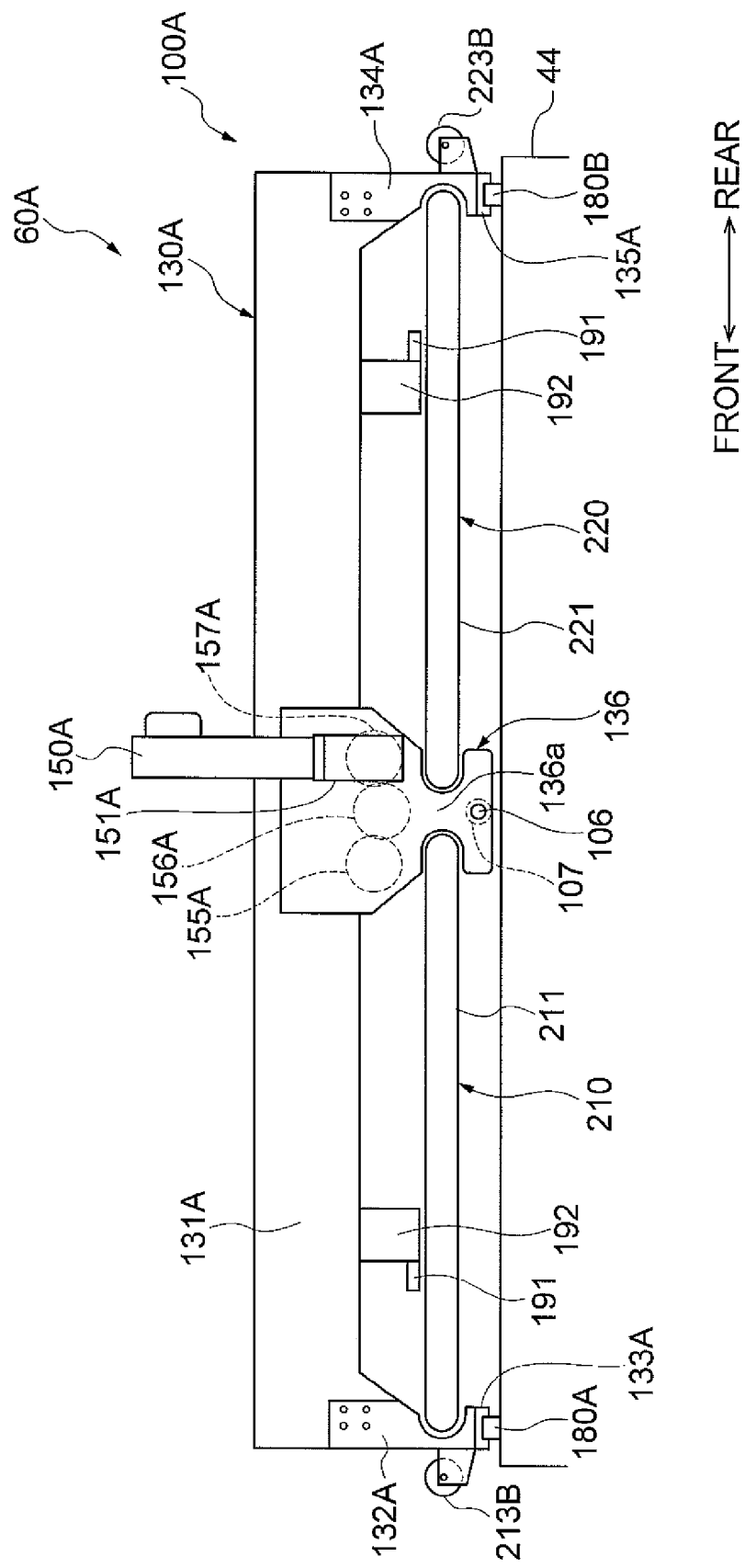
FIG. 7 is a diagram of a left base member of a side-arm transfer unit when viewed from the side.

The conveying surface (i.e., the upper surface of the endless belt 211) of the front conveyor 210 and the conveying surface (i.e., the upper surface of the endless belt 221) of the rear conveyor 220 are the same in height (see FIG. 7). On the front side of the front conveyor 210, rollers 213A and 213B are arranged with a certain gap apart from the front conveyor 210. The roller 213A is supported by the elevating platform 44. The roller 213B is supported by the left side arm 100A. The upper portions of the rotating surfaces of the rollers 213A and 213B are the same in height as the conveying surface of the front conveyor 210. Providing the rollers 213A and 213B enables packages W to be smoothly passed between the front conveyor 210 and the storage sections 24, for example. On the rear side of the rear conveyor 220, rollers 223A and 223B are arranged with a certain gap apart from the rear conveyor 220. The roller 223A is supported by the elevating platform 44. The roller 223B is supported by the left side arm 100A. The upper portions of the rotating surfaces of the rollers 223A and 223B are the same in height as the conveying surface of the rear conveyor 220. Providing the rollers 223A and 223B enables packages W to be smoothly passed between the rear conveyor 220 and the storage sections 34, for example.

(Side Arm)

The left side arm 100A and the right side arm 100B can stretch and retract in the front-and-rear direction (stretching-and-retracting direction) toward and from both sides in the left-and-right direction of a package W as depicted in FIG. 4 and FIGS. 5A to 5C. The right side arm 100B is arranged on the right side of the lower conveyor 200, and is fixed on the elevating platform 44. The left side arm 100A is arranged on the left side of the right side arm 100B. The left side arm 100A moves in the left-and-right direction along a front guide rail 180A and a rear guide rail 180B provided to the elevating platform 44.

Figure 5:
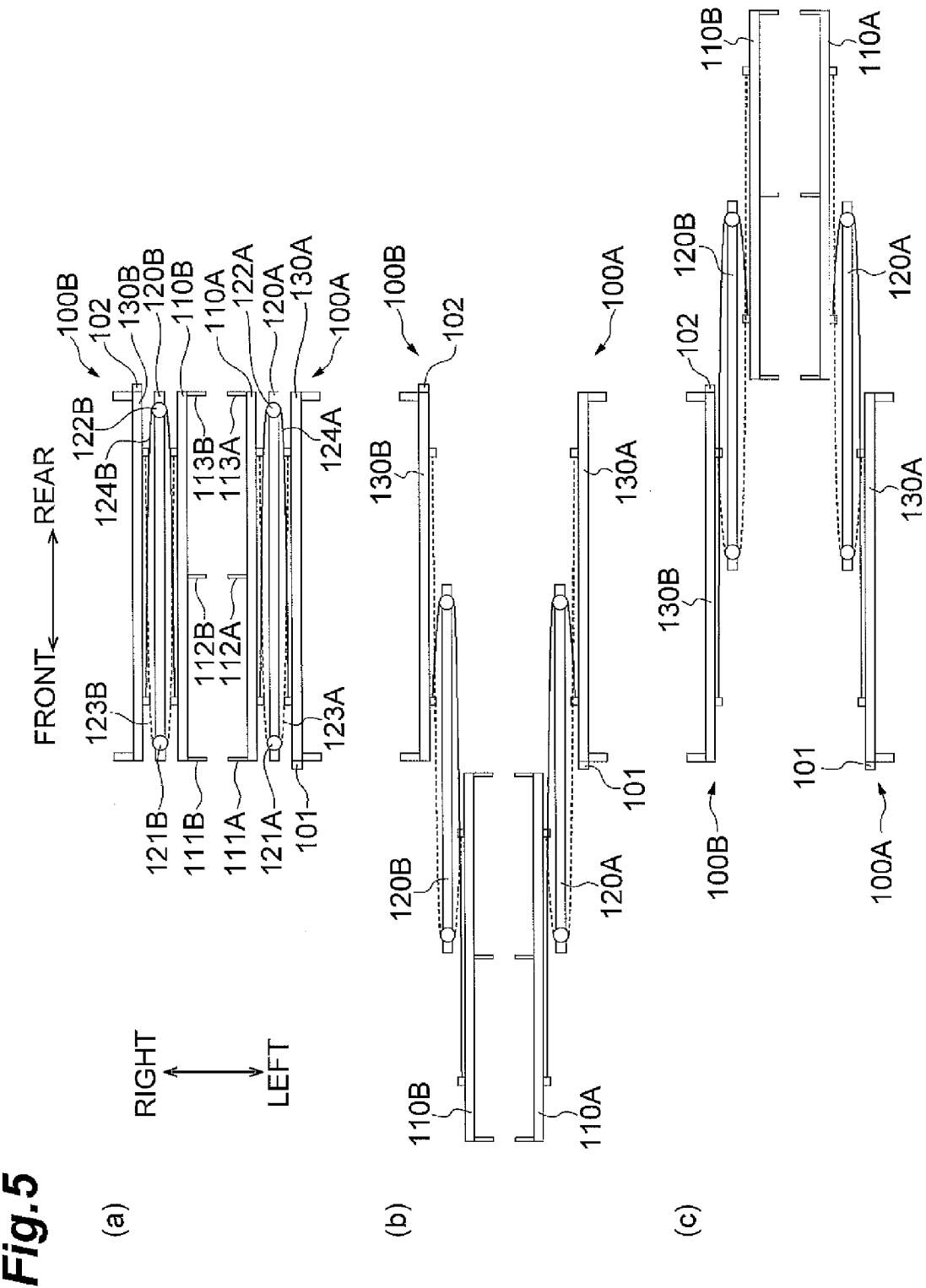
Figure 6:
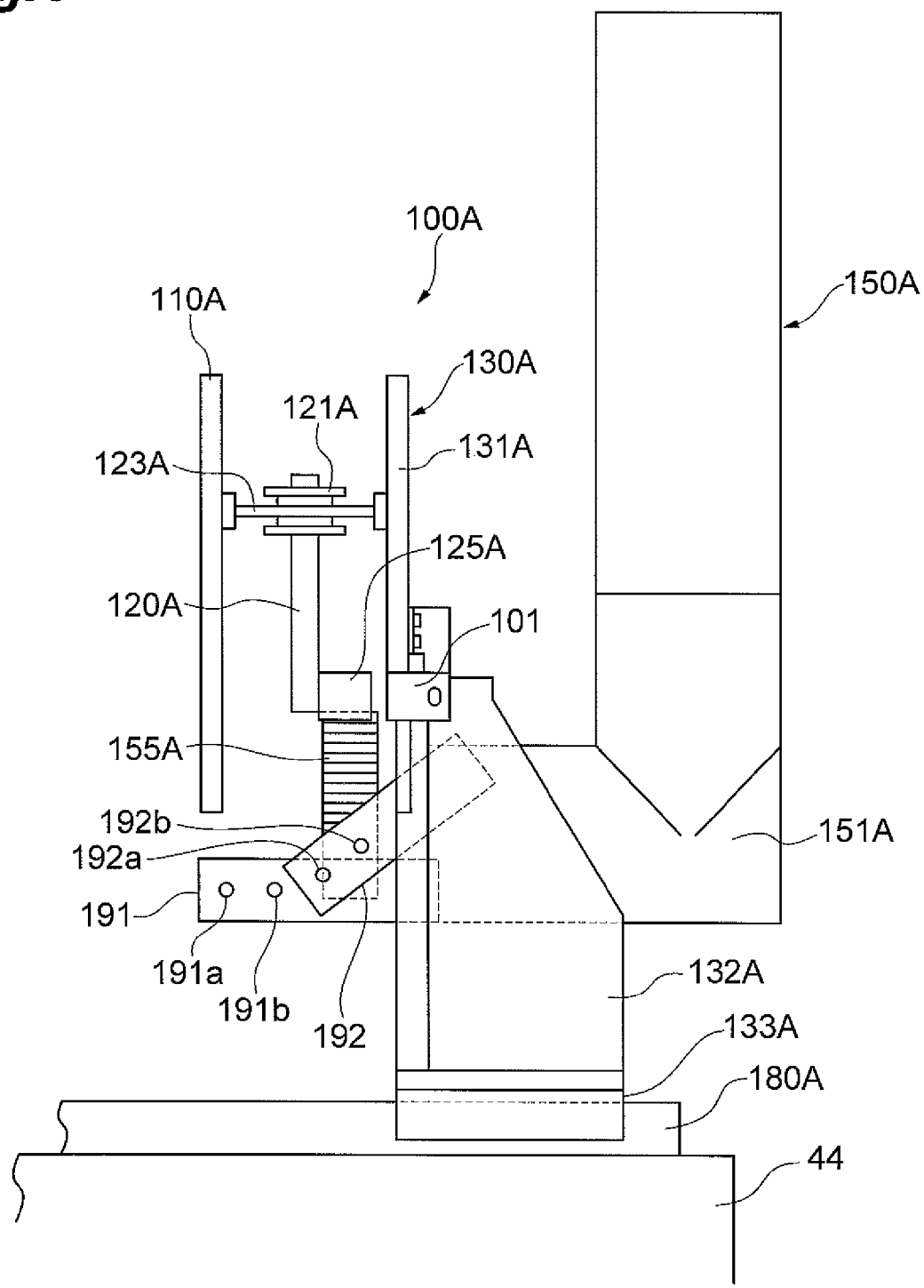
FIG. 6 is a sectional diagram taken along the line VI-VI of FIG. 4.

As depicted in FIGS. 5A and 6, the left side arm 100A includes a left top member 110A, a left middle member 120A, and a left base member 130A. The left top member 110A, the left middle member 120A, and the left base member 130A are arranged from the right side toward the left side in this order. The left top member 110A, the left middle member 120A, and the left base member 130A extend in the front-and-rear direction, and have the same length in the front-and-rear direction.

To the left middle member 120A near its front end and near its rear end, a front pulley 121A and a rear pulley 122A are respectively provided. The front pulley 121A and the rear pulley 122A rotate about axes along the height direction of the side-arm transfer unit 60A as rotation axes.

On the left base member 130A near its rear end, one end of a belt 123A is fastened, and on the left top member 110A near its rear end, the other end of the belt 123A is fastened. The belt 123A is looped over the front side of the front pulley 121A. On the left base member 130A near its front end, one end of a belt 124A is fastened, and on the left top member 110A near its front end, the other end of the belt 124A is fastened. The belt 124A is looped over the rear side of the rear pulley 122A. In FIGS. 5A to 5C, to easily distinguish between the belt 123A and the belt 124A, the belt 123A is represented by a broken line for convenience.

When the left middle member 120A is slid forward from the left base member 130A, the left top member 110A is pulled forward by the belt 123A as depicted in FIG. 5B. When the left middle member 120A is slid rearward from the left base member 130A, the left top member 110A is pulled rearward by the belt 124A as depicted in FIG. 5C. In this manner, by causing the left middle member 120A to advance and retreat with respect to the left base member 130A in the front-and-rear direction, the left top member 110A advances and retreats with respect to the left middle member 120A in the front-and-rear direction.

The right side arm 100B includes a right top member 110B, a right middle member 120B, a right base member 130B, a front pulley 121B, a rear pulley 122B, a belt 123B, and a belt 124B. Because the right top member 110B, the right middle member 120B, the right base member 130B, the front pulley 121B, the rear pulley 122B, the belt 123B, and the belt 124B are configured the same as the left top member 110A, the left middle member 120A, the left base member 130A, the front pulley 121A, the rear pulley 122A, the belt 123A, and the belt 124A, detail explanation thereof is omitted. The right side arm 100B also stretches and retracts in the front-and-rear direction on the basis of the same mechanism as that of the left side arm 100A.

The left top member 110A is provided with a front hook 111A, a central hook 112A, and a rear hook 113A that can protrude toward the right top member 110B, as depicted in FIGS. 4 and 5A, for example. The front hook 111A is provided to the left top member 110A at its front end. The central hook 112A is provided to the left top member 110A at its center in the front-and-rear direction. The rear hook 113A is provided to the left top member 110A at its rear end. As one example of each of the front hook 111A, the central hook 112A, and the rear hook 113A, one end of a rod-like member is rotatably fixed on the left top member 110A. The other end of the rod-like member can be protruded from the left top member 110A by being rotated toward the right top member 110B, and the other end of the rod-like member can be retracted into the left top member 110A by being rotated toward the left top member 110A. It should be noted that an appropriate mechanism can be used as a mechanism for protruding the front hook 111A, for example.

The right top member 110B is provided with a front hook 111B, a central hook 112B, and a rear hook 113B that can protrude toward the left top member 110A, as depicted in FIGS. 4 and 5A, for example. Because the front hook 111B, the central hook 112B, and the rear hook 113B are respectively configured the same as the front hook 111A, the central hook 112A, and the rear hook 113A that are provided to the left top member 110A, detail explanation thereof is omitted.

The side-arm transfer unit 60A transfers a package W between the side-arm transfer unit 60A and the storage sections 24, for example, by stretching and retracting the left side arm 100A and the right side arm 100B while engaging certain ones of the front hook 111A, the central hook 112A, the rear hook 113A, the front hook 111B, the central hook 112B, and the rear hook 113B with the package W. The package W transferred by the side-arm transfer unit 60A is placed on the front conveyor 210 or the rear conveyor 220.

The side-arm transfer unit 60A can simultaneously transfer two packages W by stretching and retracting the left top member 110A and the right top member 110B in such a state that the packages W exist in the respective two areas: an area between the front hooks 111A and 111B and the central hooks 112A and 112B; and an area between the central hooks 112A and 112B and the rear hooks 113A and 113B.

When a package W is transferred, the front conveyor 210 and the rear conveyor 220 are driven in conjunction with stretching and retracting of the left side arm 100A and the right side arm 100B, whereby the left side arm 100A and the right side arm 100B can be assisted to transfer the package W. When the front conveyor 210 and the rear conveyor 220 are driven, the speed of the front conveyor 210 and the rear conveyor 220 conveying the package W may be set lower than the speed of stretching and retracting the left side arm 100A and the right side arm 100B. In this case, transfer can be performed in such a state that the package W is pressed upon the front hook 111A, for example, that is pushing or pulling the package W. Accordingly, it is possible to prevent a situation that the package W cannot be transferred to a certain position due to the occurrence of slippage at the package W when stretching or retracting of the left side arm 100A and the right side arm 100B is stopped.

As depicted in FIG. 4, on the upper side of the left top member 110A, the left middle member 120A, and the left base member 130A, an upper cover 139A is provided. The upper cover 139A holds a power cable for supplying power to a drive unit that drives the rear hook 113A, for example, and signal wires for various sensors, for example. Similarly to the upper cover 139A, an upper cover 139B is provided also on the side of the right top member 110B, the right middle member 120B, and the right base member 130B. The upper covers 139A and 139B guide the power cable and the signal wires so that no strain would be placed on the power cable and the signal wires, for example, held by the upper covers 139A and 139B when the left side arm 100A and the right side arm 100B stretch and retract.

As depicted in FIGS. 6, 7, 8A, and 8B, on a surface of the left base member 130A on the side of the left middle member 120A, a front pinion gear 155A, a central pinion gear 156A, and a rear pinion gear 157A are rotatably installed with axes along the left-and-right direction as rotation axes. The central pinion gear 156A is provided to the left base member 130A at the center in the front-and-rear direction. The front pinion gear 155A is provided on the front side of the central pinion gear 156A, and the rear pinion gear 157A is provided on the rear side of the central pinion gear 156A. The front pinion gear 155A and the central pinion gear 156A engage with each other, and the central pinion gear 156A and the rear pinion gear 157A engage with each other. In the present embodiment, the front pinion gear 155A, the central pinion gear 156A, and the rear pinion gear 157A have the same number of teeth, and also have the same diameter. However, pinion gears may be used in which at least either ones of the numbers of teeth and the diameters are different from each other.

To the left middle member 120A near its lower end, a left rack gear 125A is provided. The left rack gear 125A extends in the extending direction of the left middle member 120A, i.e., the front-and-rear direction. The teeth side of the left rack gear 125A faces the elevating platform 44. The left rack gear 125A has the same length as that of the left middle member 120A in the front-and-rear direction.

In particular, as depicted in FIG. 8A, the front pinion gear 155A and the rear pinion gear 157A engage with the left rack gear 125A. The central pinion gear 156A is provided at a position lower than the front pinion gear 155A and the rear pinion gear 157A, and does not engage with the left rack gear 125A.

By reducing the amount of lowering the mounting point of the central pinion gear 156A with respect to the mounting position of the front pinion gear 155A, for example, space occupied by the front pinion gear 155A, the central pinion gear 156A, and the rear pinion gear 157A in the vertical direction (height direction of the transferring apparatus 6) can be reduced. This reduced space enables the size of the left base member 130A in the height direction to be smaller. In other words, θ is preferably a value closer to 180 degrees, where θ is an angle formed by a segment A that connects the rotation axis of the front pinion gear 155A to the rotation axis of the central pinion gear 156A and a segment B that connects the rotation axis of the central pinion gear 156A to the rotation axis of the rear pinion gear 157A.

On the surface opposite to the surface on which the front pinion gear 155A, for example, is mounted in the left base member 130A, a motor 150A is installed with an adapter 151A interposed therebetween. The motor 150A is arranged so that the rotating shaft is aligned along the height direction of the side-arm transfer unit 60A (see FIG. 6). The adapter 151A is attached to the distal end of the rotating shaft of the motor 150A. The adapter 151A changes the direction of the rotating shaft of the motor 150A by 90 degrees so that the rotating shaft of the motor 150A is directed in the left-and-right direction. The motor 150A is installed in a position posterior to the center of the left base member 130A. The drive force of the motor 150A is transmitted to the rear pinion gear 157A via the adapter 151A.

When the rear pinion gear 157A is rotationally driven by the motor 150A, the central pinion gear 156A and the front pinion gear 155A are also rotated, so that the left middle member 120A is driven in the front-and-rear direction by the rear pinion gear 157A and the front pinion gear 155A. The left middle member 120A is thus driven by the motor 150A, whereby the left top member 110A and the left middle member 120A advance and retreat with respect to the left base member 130A.

The right base member 130B is provided with a front pinion gear 155B, a central pinion gear 156B, a rear pinion gear 157B, a motor 150B, and an adapter 151B. Because the front pinion gear 155B, the central pinion gear 156B, the rear pinion gear 157B, the motor 150B, and the adapter 151B are configured the same as the front pinion gear 155A, the central pinion gear 156A, the rear pinion gear 157A, the motor 150A, and the adapter 151A, detail explanation thereof is omitted.

As depicted in FIG. 8A, the front pinion gear 155B and the rear pinion gear 157B engage with the right rack gear 125B provided to the right middle member 120B. Because the right rack gear 125B is configured the same as the left rack gear 125A, detail explanation thereof is omitted.

As depicted in FIG. 8B, the motor 150A and the motor 150B are arranged outside an area between a pair of the left base member 130A and the right base member 130B. The motor 150B herein is installed in a position anterior to the central position of the right base member 130B. The drive force of the motor 150B is transmitted to the front pinion gear 155B via the adapter 151 B. In other words, in the present embodiment, the motor 150A and the motor 150B are connected to pinion gears (herein, the rear pinion gear 157A and the front pinion gear 155B) that are point-symmetrical, when viewed from the height direction of the side-arm transfer unit 60A, with respect to the center P of positions where the front pinion gears 155A and 155B, the central pinion gears 156A and 156B, and the rear pinion gears 157A and 157B that are provided to the pair of left base member 130A and the right base member 130B.

The side-arm transfer unit 60B is configured the same as the side-arm transfer unit 60A, in which the motor 150A provided to the left side arm 100A is connected to the rear pinion gear 157A, and the motor 150B provided to the right side arm 100B is connected to the front pinion gear 155B. Accordingly, as depicted in FIG. 4, the motor 150B and the motor 150A that are positioned between the right side arm 100B of the side-arm transfer unit 60A and the left side arm 100A of the side-arm transfer unit 60B are connected to pinion gears whose positions in the front-and-rear direction are different from each other.

As depicted in FIGS. 5A and 6, the front end of the left base member 130A of the left side arm 100A is provided with a front proximity sensor 101. The front proximity sensor 101 detects the left rack gear 125A provided to the left middle member 120A as a magnetic body to be detected. Specifically, the front proximity sensor 101 detects a state in which the left rack gear 125A faces a detector plane on the right side of the front proximity sensor 101 as an ON state, and detects a state in which the left rack gear 125A does not face the detector plane on the right side of the front proximity sensor 101 as an OFF state.

The rear end of the right base member 130B of the right side arm 100B is provided with a rear proximity sensor 102. The rear proximity sensor 102 detects the right rack gear 125B provided to the right middle member 120B as a magnetic body to be detected. Specifically, the rear proximity sensor 102 detects a state in which the right rack gear 125B faces a plane on the left side of the rear proximity sensor 102 as an ON state, and detects a state in which the right rack gear 125B does not face the plane on the left side of the front proximity sensor 102 as an OFF state.

As depicted in FIG. 5A, the front proximity sensor 101 is attached to the front end of the left base member 130A, and the rear proximity sensor 102 is attached to the rear end of the right base member 130B. Accordingly, the length of the left rack gear 125A and the right rack gear 125B in the front-and-rear direction is shorter than the length between the front proximity sensor 101 and the rear proximity sensor 102 in the front-and-rear direction.

As depicted in FIG. 4, the side-arm transfer unit 60A is provided with a determination unit 103. The determination unit 103 determines a stretching direction indicating which side in the front-and-rear direction the left side arm 100A and the right side arm 100B are stretching on the basis of detection results of the front proximity sensor 101 and the rear proximity sensor 102. The position where the determination unit 103 is provided is not limited to the position near the left side arm 100A depicted in FIG. 4, and may be provided at any appropriate position.

As depicted in FIG. 5A, when the left side arm 100A and the right side arm 100B are in a state of not stretching, both of the front proximity sensor 101 and the rear proximity sensor 102 are in the OFF state. Accordingly, the determination unit 103 determines that both of the left side arm 100A and the right side arm 100B are in the state of not stretching.

As depicted in FIG. 5B, when the left side arm 100A and the right side arm 100B are in a state of stretching forward, the front proximity sensor 101 is in the ON state and the rear proximity sensor 102 is in the OFF state. Accordingly, the determination unit 103 determines that both of the left side arm 100A and the right side arm 100B are in the state of stretching forward.

As depicted in FIG. 5C, when the left side arm 100A and the right side arm 100B are in a state of stretching rearward, the front proximity sensor 101 is in the OFF state and the rear proximity sensor 102 is in the ON state. Accordingly, the determination unit 103 determines that both of the left side arm 100A and the right side arm 100B are in the state of stretching rearward.

Without providing a proximity sensor to both ends in the front-and-rear direction of the left base member 130A or to both ends in the front-and-rear direction of the right base member 130B, by providing the front proximity sensor 101 and the rear proximity sensor 102 to the front end of the left base member 130A and the rear end of the right base member 130B, respectively, as in the present embodiment, which direction the left side arm 100A and the right side arm 100B are stretching can be detected for both directions of the front direction and the rear direction.

The front proximity sensor 101 for detecting that the arms are stretching forward is attached to the left base member 130A, and the rear proximity sensor 102 for detecting that the arms are stretching rearward is provided to the right base member 130B. Accordingly, the front proximity sensor 101 can be used as a sensor for detecting whether the left base member 130A is operating, and the rear proximity sensor 102 can be used as a sensor for detecting the right base member 130B is operating. For example, if the front proximity sensor 101 and the rear proximity sensor 102 are provided to the left base member 130A, an additional sensor for detecting whether the right base member 130B is operating needs to be provided, but this is not required in the present embodiment.

As depicted in FIG. 7, the left base member 130A includes a base body member 131A, a front guide leg-member 132A, a front guide block 133A, a rear guide leg-member 134A, a rear guide block 135A, a movement leg-member 136, and a nut 107 (see FIG. 4).

The base body member 131A extends in the front-and-rear direction to support the left middle member 120A and the left top member 110A, for example. The front guide leg-member 132A and the rear guide leg-member 134A are respectively provided to both ends in the front-and-rear direction of the base body member 131A. The front guide leg-member 132A and the rear guide leg-member 134A each extend downward from the base body member 131A. In the front-and-rear direction, between the front guide leg-member 132A and the rear guide leg-member 134A, the front conveyor 210 and the rear conveyor 220 are provided.

The front guide leg-member 132A has a shape that does not interfere with the front conveyor 210 when viewed from the left-and-right direction. The rear guide leg-member 134A has a shape that does not interfere with the rear conveyor 220 when viewed from the left-and-right direction.

The front guide block 133A is attached to the lower end of front guide leg-member 132A. The front guide block 133A slidably engages with the front guide rail 180A provided to the elevating platform 44. The rear guide block 135A is attached to the lower end of rear guide leg-member 134A. The rear guide block 135A slidably engages with the rear guide rail 180B.

The front guide rail 180A and the rear guide rail 180B are provided on the upper surface of the elevating platform 44. The front guide rail 180A is provided near the front end of the upper surface of the elevating platform 44, and extends in the left-and-right direction. The rear guide rail 180B is provided near the rear end of the upper surface of the elevating platform 44, and extends in the left-and-right direction.

The movement leg-member 136 is provided between the front guide leg-member 132A and the rear guide leg-member 134A. The movement leg-member 136 is mounted on the base body member 131A at the center in the front-and-rear direction, and extends to a point on the lower side of the endless belt 211 of the front conveyor 210 and the endless belt 221 of the rear conveyor 220.

The movement leg-member 136 has a constricted portion 136a whose length in the front-and-rear direction is constricted so that no interference occurs between the endless belt 211 and the endless belt 221 when viewed from the left-and-right direction.

The nut 107 is attached to the lower end of the movement leg-member 136. In other words, the nut 107 is in a position lower than the endless belt 211 and the endless belt 221.

As depicted in FIG. 4, the right base member 130B of the right side arm 100B is provided with the motor 105. Between the left base member 130A and the right base member 130B, a ball screw 106 is disposed across. One end of the ball screw 106 is connected to the rotating shaft of the motor 105, and the other end thereof is threadably engaged with the nut 107. The ball screw 106 is arranged along the left-and-right direction similarly to the front guide rail 180A and the rear guide rail 180B.

Because the right base member 130B is fixed on the elevating platform 44, when the ball screw 106 is rotated by the motor 105, the nut 107 threadably engaging with the ball screw 106 moves along the extending direction of the ball screw 106. Thus, when the ball screw 106 is rotated by the motor 105, the left base member 130A moves in the left-and-right direction while being guided by the front guide rail 180A and the rear guide rail 180B.

Because the distance between the left base member 130A and the right base member 130B can be adjusted, in accordance with the size in the left-and-right direction of a package W to be conveyed, the distance between the left side arm 100A and the right side arm 100B can be adjusted.

As depicted in FIGS. 6 and 7, to the left base member 130A near its front end, a first light-emitting sensor 191 and a second light-emitting sensor 192 are provided. The first light-emitting sensor 191 and the second light-emitting sensor 192 are fixed on the base body member 131A. The first light-emitting sensor 191 and the second light-emitting sensor 192 are arranged above the endless belt 211 of the front conveyor 210. The first light-emitting sensor 191 and the second light-emitting sensor 192 detect a package W that exists on the front side of the side-arm transfer unit 60A. Distances to a package W that the first light-emitting sensor 191 and the second light-emitting sensor 192 detect are different from each other.

The first light-emitting sensor 191 emits light from a light-emitting portion 191a, and receives light reflected by a package W at a light-receiving portion 191b. The second light-emitting sensor 192 emits light from a light-emitting portion 192a, and receives light reflected by the package W at a light-receiving portion 192b. Cases of the first light-emitting sensor 191 and the second light-emitting sensor 192 partially overlap each other in the height direction of the side-arm transfer unit 60A when viewed from the front-and-rear direction. Because the overlapping part is different from the positions where the light-emitting portions 191a and 192a and the light-receiving portions 191b and 192b are provided, functions of the first light-emitting sensor 191 and the second light-emitting sensor 192 will not be impaired.

The first light-emitting sensor 191 and the second light-emitting sensor 192 are additionally provided to the left base member 130A near the rear end. The first light-emitting sensor 191 and the second light-emitting sensor 192 herein detect a package W that exists on the rear side of the side-arm transfer unit 60A. Because the first light-emitting sensor 191 and the second light-emitting sensor 192 provided near the rear end of the left base member 130A are configured the same as the first light-emitting sensor 191 and the second light-emitting sensor 192 provided near the front end of the left base member 130A, detail explanation thereof is omitted. In the same manner as the left base member 130A, also to the right base member 130B, the first light-emitting sensor 191 and the second-light emitting sensor 192 are provided in each position of the front end and the rear end of the right base member 130B.

The present embodiment is configured as described above, where in the transferring apparatus 6, the positions of two motors 150A and 150B that are positioned between the right side arm 100B of the side-arm transfer unit 60A and the left side arm 100A of the side-arm transfer unit 60B are shifted from each other in the stretching-and-retracting direction of the left side arm 100A and the right side arm 100B. When the side-arm transfer unit 60A and the side-arm transfer unit 60B are arranged side by side, this shift enables the distance in the left-and-right direction between the side-arm transfer unit 60A and the side-arm transfer unit 60B to be reduced without interference with each other of the two motors 150A and 150B positioned between the right side arm 100B of the side-arm transfer unit 60A and the left side arm 100A of the side-arm transfer unit 60B. This reduced distance enables the size of the transferring apparatus 6 in the left-and-right direction to be smaller.

When the length in the front-and-rear direction between the center of the rear pinion gear 157A that is connected to the motor 150A provided to the left base member 130A and the center of the front pinion gear 155B that is connected to the motor 150B provided to the right base member 130B (see FIG. 8B) is longer than the size of housings of the motors 150A and 150B in the front-and-rear direction, the distance between the side-arm transfer unit 60A and the side-arm transfer unit 60B in the left-and-right direction can be reduced without interference between the motor 150A and the motor 150B.

Because the size of the transferring apparatus 6 in the left-and-right direction can be reduced, the receiving station 25 and the shipping station 35 where packages W are transferred between transferring apparatuses 6 can also be made smaller in the left-and-right direction. Furthermore, because the distance between the side-arm transfer unit 60A and the side-arm transfer unit 60B can be reduced only by changing positions of connecting the motor 150A and the motor 150B to the pinion gears 155A to 157A and 155B to 157B, mechanisms themselves of the pinion gears 155A to 157A and 155B to 157B and the rack gears 125A and 125B can be made common between the side-arm transfer unit 60A and the side-arm transfer unit 60B.

By configuring the side-arm transfer unit 60B the same as the side-arm transfer unit 60A, the side-arm transfer unit 60A and the side-arm transfer unit 60B can be arranged side by side in a quantity of three or more with a reduced distance between the side-arm transfer unit 60A and the side-arm transfer unit 60B without interference between the motor 150A and the motor 150B. Because the positions where the motor 150A and the motor 150B are installed are the same in the side-arm transfer unit 60A and the side-arm transfer unit 60B, load variations between the side-arm transfer unit 60A and the side-arm transfer unit 60B can be reduced.

Because the motor 150A and the motor 150B are arranged point-symmetrically with respect to the respective pinion gears 155A to 157A and 155B to 157B provided to the side-arm transfer unit 60A, the right side arm 100B can be configured the same as the left side arm 100A in the side-arm transfer unit 60A, whereby commonality of components can be achieved.

By making the left side arm 100A movable in the left-and-right direction, the distance between the left side arm 100A and the right side arm 100B can be adjusted in accordance with the size of a package W, so that various sizes of packages W can be transferred.

One embodiment of the present invention has been described in the foregoing, but the present invention is not limited to the above-described embodiment. For example, it has been assumed in the embodiment that three pinion gears are used to drive the middle member of each side arm as depicted in FIG. 8A, but three or more (e.g., five) pinion gears may be used.

It has been assumed that the only left side arm 100A is movable in the left-and-right direction, but the right side arm 100B may be movable in the left-and-right direction in the same manner as the left side arm 100A.

It has been assumed that packages W are hooked by the hooks 111A to 113A and 111B to 113B to be transferred, but the left top member 110A and the right top member 110B may be configured to catch and transfer the packages W.

It has been assumed that the transferring apparatus 6 includes the side-arm transfer unit 60A and the side-arm transfer unit 60B, but the transferring apparatus 6 may include three or more side-arm transfer units 60A.

It should be noted that at least the positions in the front-and-rear direction of the motor 150B provided to the right side arm 100B of the side-arm transfer unit 60A and the motor 150A provided to the left side arm 100A of the side-arm transfer unit 60B only have to be different from each other, and the position of the motor 150A provided to the left side arm 100A of the side-arm transfer unit 60A and the position of the motor 150B provided to the right side arm 100B of the side-arm transfer unit 60B are not limited to the positions described in the embodiment.

INDUSTRIAL APPLICABILITY

According to one aspect of the present invention, the size of the apparatus body can be made smaller.

REFERENCE SIGNS LIST

1 . . . automated warehouse, 6 . . . transferring apparatus, 44 . . . elevating platform (body portion), 60A, 60B . . . side-arm transfer unit, 100A . . . left side arm, 100B . . . right side arm, 101 . . . front proximity sensor, 102 . . . rear proximity sensor, 103 . . . determination unit, 105 . . . motor, 106 . . . ball screw, 107 . . . nut, 110A . . . left top member, 110B . . . right top member, 120A . . . left middle member, 120B . . . right middle member, 125A . . . left rack gear, 125B . . . right rack gear, 130A . . . left base member, 130B . . . right base member, 131A . . . base body member, 132A . . . front guide leg-member, 133A . . . front guide block, 134A . . . rear guide leg-member, 135A . . . rear guide block, 136 . . . movement leg-member, 150A, 150B . . . motor, 155A, 155B . . . front pinion gear, 156A, 156B . . . central pinion gear, 157A, 157B . . . rear pinion gear, 191 . . . first light-emitting sensor, 192 . . . second light-emitting sensor, 200 . . . lower conveyor, W . . . package (object to be conveyed).

The invention claimed is:

1. A transferring apparatus comprising:
a plurality of side-arm transfer units each provided with a pair of side arms each of which is capable of stretching toward and retracting from both sides of an object to be conveyed, wherein
the side-arm transfer units are arranged side by side in a left-and-right direction that is orthogonal to a stretching-and-retracting direction of the side arms,
each of the side arms comprises:
a base member;
a middle member that advances from and retreats to the base member in the stretching-and-retracting direction; and
a top member that advances from and retreats to the middle member in the stretching-and-retracting direction,
the base member comprises:
three or more pinion gears that are arranged along the stretching-and-retracting direction; and
a motor that drives the pinion gears,
the middle member comprises a rack gear that engages with at least one of the pinion gears and extends in the stretching-and-retracting direction,
the motor is arranged outside an area between a pair of the base members of the pair of the side arms,
the motor is positioned between one side-arm transfer unit and an adjacent side-arm transfer unit, and is connected to a pinion gear whose position in the stretching-andretracting direction is different from the position of another pinion gear to which another motor positioned between the one side-arm transfer unit and the adjacent side-arm transfer unit is connected, the numbers of the pinion gears included in the respective ones of the pair of the base members of the side-arm transfer units are the same, and the respective motors included in the respective ones of the pair of the base members of the side-arm transfer units are connected to the pinion gears that are rotation symmetric with respect to a center point of the pinion gears' positions where the pinion gears included in the pair of the base members are arranged, wherein the motor provided to the side arm on a left side of the left-and-right direction in the one of the side-arm transfer units and the motor provided to the side arm on the left side of the left-and-right direction in the other one of the side-arm transfer units are connected to the pinion gears whose positions in the stretching-and-retracting direction are the same, and the motor provided to the side arm on a right side of the left-and-right direction in the one of the side-arm transfer units and the motor provided to the side arm on the right side of the left-and-right direction in the other one of the side-arm transfer units are connected to the pinion gears whose positions in the stretching-and-retracting direction are the same.

2. The transferring apparatus according to claim 1, wherein the base member of at least one of the side arms out of the pair of the side arms is movable in the left-and-right direction.

\* \* \* \* \*